United States Patent Office 3,397,139
Patented Aug. 13, 1968

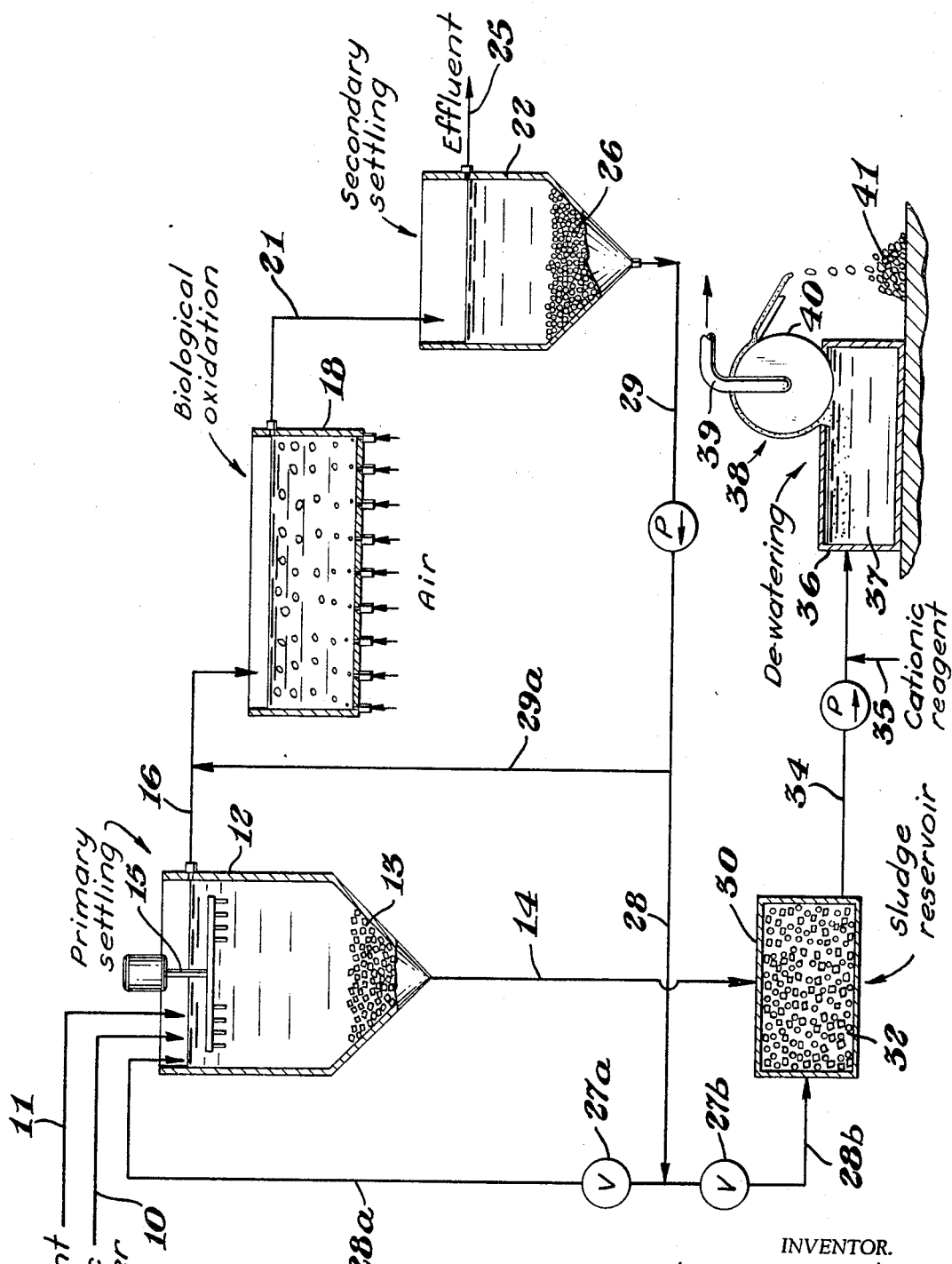

3,397,139
WASTE TREATMENT PROCESS
James G. Sak, Midland, Mich., assignor to The Dow Chemical Company, Midland, Mich., a corporation of Delaware
Filed Jan. 25, 1967, Ser. No. 611,673
6 Claims. (Cl. 210—7)

ABSTRACT OF THE DISCLOSURE

The present invention involves an improved secondary waste treatment process. Such processes normally comprise the unit operations of primary settling, biological oxidation, secondary settling and dewatering of a mixed sludge from the primary and secondary settling operations. These operations are modified herein with the use of a high molecular weight organic anionic polymer flocculant in the primary settling operation and the use of cationic reagents, especially cationic organic polymers, to condition the mixed sludge for dewatering. As the process is practiced herein, this sludge is an adjusted mixture of secondary and primary sludge solids, with a significantly lower proportion of secondary sludge solids.

---

It is known that sewage sludges, which are essentially non-free settling aqueous suspensions of predominantly hydrophilic organic solids, can be conditioned for dewatering by the addition thereto of cationic reagents. In recent years, cationic water-soluble polymers have been discovered to be particularly useful for this purpose. U.S. Patents 3,014,896 and 3,259,570 illustrate a large number of suitable cationic polymers.

The sludge must be chemically conditioned so that it readily releases water under applied forces to produce a solid compact mass of sludge solids. Such a solid sludge cake is normally a prerequisite to sludge disposal techniques. Sludges prior to dewatering will often contain anywhere from about 4 up to as much as 15 percent by weight or so suspended solids. A dewatered sludge cake will usually contain no more than about 18 to 22 percent by weight solids, but concentration to even this small extent presents considerable technical difficulty and expense with respect to the mixed sludges of concern herein.

One of the most difficult operational aspects of the secondary waste treatment process is the conditioning of its mixed sludge for dewatering. Heretofore cationic polymers generally have not been economical for this purpose, because the mixed sludges require large amounts of cationic reagents for effective conditioning.

It is a particular object of the invention to provide an improved secondary waste treatment process, with a principal benefit being the achievement of a substantial reduction in the amount of cationic polymer that is required for conditioning the mixed sludges for dewatering. Further benefits and objects of the invention are to provide a secondary waste treatment process with overall improved operating efficiencies with regard to sludge handling. A particular object is to provide a secondary waste treatment process in which the ratio of secondary sludge to primary sludge solids is reduced. The foregoing objects, and other benefits as will be apparent hereinafter, are achieved in accordance with the following invention.

In terms of basic unit operations, the instant invention involves a secondary waste treatment process which normally comprises subjecting a waste stream to the steps of primary settling, biological oxidation and secondary settling of the effluent from the biological oxidation operation. To aid the biological oxidation step, it is customary to recycle some portion of the secondary sludge solids. The biological oxidation may be accomplished by aeration in trickling filters or by the activated sludge technique. Sludges wasted from the primary and secondary settling operations are mixed and dewatered.

Prior to introduction into a mechanical separatory device, such as a vacuum filter, centrifuge or gravity compaction unit, the mixed sludge is conditioned for dewatering by admixing therewith, under mild agitation, a water-soluble cationic reagent, preferably a water-soluble cationic organic polymer.

The above described secondary waste treatment process is improved by adding a small amount of a high molecular weight, water-soluble, anionic organic polymer to the waste stream in the primary settling step. The small amount added is within the range from about 0.05 up to about 2 parts per million by weight, based on the weight of the influent waste stream. The process is further improved by adjusting the amount of secondary sludge wasted from the system and mixed with the primary sludge to produce a mixed sludge of relative proportions such that the secondary to primary sludge solids ratio is decreased, by at least 40 percent of what the ratio would be in the normal operation of the plant, without the use of chemical flocculation in the primary settling operation, and in any event, such ratio is adjusted to less than about 0.9.

Normally in the operation of secondary treatment plants this ratio is greater than 1 and will frequently be found to be from 2 to 4. As a result of operation in the aforedescribed manner, the amount of cationic reagent required to condition the mixed sludge for dewatering is substantially reduced.

The invention will be more readily understood by reference to the accompanying drawing which schematically illustrates the various unit operations essential to the practice of the invention and several alternative modes of operation.

In the drawing, influent raw sewage 11, which may have been previously passed through a commutator or degritter, is fed to a primary settling tank 12 wherein the sewage is subjected to flocculating and settling conditions. To facilitate settling an anionic polymer 10, as previously described, is mixed with the raw sewage 11. The treated sewage is subjected to slow agitation as by means of a slowly rotating paddle mixer 15, under conditions of sufficient quiescence to achieve settling of suspended solids to form a sludge 13 withdrawn at the bottom of the tank 12 through sludge line 14. This sludge 13 is fed directly to a holding tank 30. Optionally a digestion or thickening unit may be incorporated into the line in place of the holding tank 30 to maintain a reservoir of sludge to be dewatered.

Partially clarified primary effluent 16 from the primary settling tank 12 passes into an activated sludge unit 18 for biological oxidation. A trickling filter may be substituted for the activated sludge unit. In either case, the effluent 21 produced as the result of biological oxidation passes into a secondary settling tank 22. A final separation of suspended solids to prepare a secondary sludge 26 occurs in a manner similar to the settling operation carried out in the primary settling tank 12. Effluent from the secondary settling tank 22 is clarified waste 25. The settled secondary sludge 26 is recycled or wasted.

Wasting of the secondary sludge is accomplished by feeding it to either the primary settling tank 12 or to the holding tank 30 through sludge discharge lines 28 and 28a or 28b, by appropriate operation of valve 27a or 27b. If returned to the primary settling tank 12, it is mixed and settled with raw sewage solids to form the mixed sludge at this point. Otherwise, it is wasted directly to the holding tank 30, which, in any event, contains the mixed sludge 32. A portion of the secondary sludge 26 is recycled through recycle line 29a to the activated sludge unit 18 for biological seeding of the primary effluent 16 to be oxidized.

In accordance with the invention, the amount of secondary sludge solids 26 discharged or wasted from the system is reduced in relation to the raw sewage solids captured in the primary settling tank 12 to achieve a reduction in the ratio of secondary sludge solids 26 to primary sludge solids 13 in the mixed sludge 32 on the order of at least 40 percent. Said reduction is in relation to the normal operating solids ratio for the plant, without the use of chemical flocculation in the primary settling operation. The amount of secondary sludge solids wasted will be further adjusted as necessary to maintain a secondary sludge/primary sludge solids ratio in the mixed sludge 32 of less than about 0.9.

The mixed sludge 32 is then fed to a vacuum filter 38 through sludge feed line 34. Conditioning of the mixed sludge 32 for dewatering is achieved by mixing therewith an aqueous solution of a water-soluble cationic polymer 35 under mild agitation. Adequate agitation may be achieved by introducing the polymer 35 into sludge line 34 or by gentle stirring of the polymer-sludge mixture 37 in the sludge pan 36 of the filter 38. The polymer conditioned sludge mixture 37 is then taken-up onto the filter drum 40, which separates the sludge into filtrate 39 and sludge solids 41.

Preferably the cationic polymeric conditioning agent is a cationic, water-soluble organic polymer containing nitrogen in and along the polymer chain in the reduced form. A large number of examples of such polymers are described in the aforementioned United States Patents 3,014,896 and 3,259,570. In addition to the preferred cationic reagents, ferric chloride and lime may also be used.

The polymers used in the primary settling operation are high molecular weight, synthetic polymers obtained by the polymerization of ethylenically unsaturated monomers. Preferably such polymer chains are characterized by substitution with a plurality of carboxylate and/or sulfonate groups. Illustratively, such polymers can be prepared from sodium acrylate, potassium styrene sulfonate, potassium vinylbenzyl sulfonate, sodium ethylene sulfonate, sodium maleate, and ammonium methacrylate. These monomers may be homopolymerized, or copolymerized with other ethylenically unsaturated monomers polymerizable therewith to prepare water-soluble polymers. Usually, a minimum of at least about 50 mole percent of the combined monomer moieties should bear water-solubilizing groups to ensure that the resulting polymer is properly water-soluble. It is also essential that a minimum of about 4 mole percent of the monomer moieties combined in the finished polymer bear an anionic substituent.

By "high molecular weight" as applied to the above anionic polymeric agents, is meant an average molecular weight of at least about 1 million as determined by light scattering measurements. The term "water-soluble" means dispersible in water to provide a visually continuous and essentially transparent dispersion.

A preferred species of anionic polymer for use in accordance with the present invention is a high molecular weight homopolymer of an alkali metal salt of vinylbenzene sulfonic acid. Similar polymers correspond to water-soluble copolymers of a major proportion of vinylbenzene sulfonic acid, or an alkali metal salt thereof, and a minor proportion of a monomer copolymerizable therewith such as acrylamide, methacrylamide, acrylonitrile, methacrylonitrile, styrene, vinyl toluene, methylacrylate and the like. For best results, such polymeric agents should have a molecular weight of at least 4,000,000. Further improved results are obtained with even higher molecular weights, provided the polymer remains effectively water-soluble.

Other anionic polyelectrolytes suitable for use in accordance with the invention are the high molecular weight, water-soluble copolymers of styrene and maleic acid. Such copolymers are generally employed in the form of the alkali metal salts thereof, preferably the sodium salt. In order to obtain the advantages of the invention, the copolymers should have molecular weights of at least 1,000,000 and preferably of at least 4,000,000.

Anionic acrylic polymers that are useful in the present invention are water-soluble high molecular weight polymers obtained by the vinyl polymerization of acrylic acid, methacrylic acid, sulfoethyl acrylate, carboxyethyl acrylate and water-soluble salts of the foregoing or by copolymerization of the acidic monomers, or alkali metal salts thereof, with suitable amounts up to a major proportion, e.g. 90 mole percent or so, of other vinyl monomers such as acrylamide and methacrylamide.

Useful anionic polymeric agents can also be produced by hydrolysis of preformed non-ionic polymers. For example, vinyl polymerized forms of acrylonitrile or methacrylonitrile can be hydrolyzed by reacting them with an aqueous alkali metal hydroxide solution to convert the nitrile groups to the corresponding alkali metal carboxylate groups. Similarly, polymers or copolymers of alkyl esters of unsaturated acids can be saponified with an alkali metal hydroxide to convert ester groups to alkali metal carboxylate groups.

In addition to the foregoing anionic polymers, various anionic modified forms of polysaccharides are also useful. These include carboxymethyl cellulose, carboxymethyl starch, sulfoethyl cellulose and the like. Molecular weights of at least about 100,000 are essential to efficient operation with these polymers.

In the practice of the invention, the high molecular weight anionic polymer is incorporated into the raw waste stream with sufficient agitation to uniformly disperse it throughout the waste. Subsequently sufficient agitation is applied to induce flocculation of suspended solids. It is often advantageous to incorporate the polymer into the waste stream as it enters comminuters or agitated grit chambers through which the sewage may pass prior to its entry into the primary settling tank.

The polymer will normally be applied as a relatively dilute solution, although if incorporated into the waste stream sufficiently in advance of the primary settler, it may be added to the waste stream as a solid or aqueous concentrate. Dissolution of the polymer will occur as it flows through conduits, pumps, and other mechanical devices in the waste line which provide mixing agitation. Once uniformly dispersed throughout the waste stream, flocculation will begin, even prior to the primary settling tank, but once within the settler, conditions of mild agitation optimum for flocculation and settling are maintained.

Since waste activated sludge solids are usually already in an agglomerated condition, preferred practice is to incorporate the polymer into the raw waste stream prior to its mixing with recycled sludge. If desired, however, the polymer may be added after mixing of the secondary sludge solids with the influent raw waste. In the latter case, however, there may be somewhat higher polymer demand to accomplish equivalent clarification of the overhead, inasmuch as the secondary sludge solids will represent additional polymer demand, which is not normally satisfied by polymer previously incorporated into raw sewage.

The following examples illustrate practice in accordance with the instant invention.

EXAMPLE 1

During a given period, the operation of an activated sludge, secondary waste treatment plant having a flow diagram schematically similar to the drawing was modified by incorporating a high molecular weight anionic polymer into influent sewage to the plant's primary settling tank. The polymer was a water-soluble sodium polystyrene sulfonate having a molecular weight of at least about 4,000,000. Effluent from this settler passed through an activated sludge aeration unit. The biologically activated solids suspension thus produced was passed into a secondary settling unit, from which settled solids were returned in part to the biological aerator and in part wasted to the primary settling tank. A mixed sludge of raw primary solids and secondary sludge solids recovered as underflow from the primary settler was fed to a holding tank and then to a vacuum filter. A cationic polymer was employed in conditioning the mixed sludge solids for dewatering on the vacuum filter. This polymer was gently stirred into the sludge contained within the sludge pan of the filter.

Data was obtained on the operation of the plant with and without the use of the high molecular weight polystyrene sulfonate. When the anionic polymer was used, the amount of biological solids wasted was adjusted as necessary to reduce the ratio of biological solids to raw solids in the mixed sludge below about 0.9.

The foregoing was repeated in several other secondary waste treatment plants. The data accumulated for each plant are summarized in the following table.

TABLE I

| | Primary Polymer, p.p.m.[1] | Sludge Solids Ratios, Secondary/Primary | Sludge Ratio Reduction, Percent | Filter Polymer, lbs./ton | Polymer Savings, Percent |
|---|---|---|---|---|---|
| Plant No.: | | | | | |
| 1 | 0 | 0.80 | | 8.4 | |
| 1 | 0.25 | 0.36 | 55 | 5.6 | 33 |
| 2 | 0 | 3.2 | | 11 | |
| 2 | 0.75 | 0.9 | 72 | 5.3 | 52 |
| 3 | 0 | 1.15 | | 37 | |
| 3 | 1 | 0.32 | 72 | 8.8 | 76 |

[1] Parts per million based on total weight of sewage treated.

From the foregoing data, it is apparent that the use of a small amount of an anionic polymer flocculant in the primary settler of a secondary waste treatment plant, with the indicated adjustment in the ratio of wasted biological solids made possible through the use of the polymer, has a profound beneficial effect on the amount of cationic polymer required to accomplish dewatering.

In a manner similar to the foregoing, it has been discovered that a small amount of high molecular weight polyacrylamide characterized by a molecular weight of at least about 2 million and hydrolysis of about 30% produces similar highly beneficial results.

What is claimed is:

1. In a secondary waste treatment process which involves subjecting raw sewage having organic waste components to the steps of primary settling, biological oxidation, secondary settling of effluent from the biological oxidation step, recycling of biologically produced secondary sludge solids to the biological oxidation step and dewatering of a mixed sludge of primary sludge solids and wasted secondary sludge solids, the improvement which consists in (1) incorporating into the raw sewage a small amount of a high molecular weight, water-soluble, anionic polymeric flocculant, the amount of said polymer used being within the range from about 0.05 up to about 2 parts per million, based on the weight of the treated sewage, (2) wasting biologically produced secondary sludge solids and mixing the same with raw sewage primary sludge solids at a solids ratio of less than about 0.9 and which ratio is further qualified as being at least 40 percent less than the corresponding ratio for the plant when chemical flocculation is not practiced in the primary settling step, and (3) conditioning the mixed sludge for dewatering with a water-soluble cationic reagent.

2. A method as in claim 1 wherein the cationic reagent used in conditioning the mixed sludge is a water-soluble cationic organic polymer.

3. A method as in claim 1 wherein the wasted secondary sludge solids are mixed with the influent raw sewage in the primary settling step.

4. A method as in claim 3 wherein the anionic polymeric flocculant is incorporated into the raw sewage prior to mixing the biologically produced secondary sludge solids therewith.

5. A method as in claim 1 wherein the high molecular weight, anionic polymeric flocculant is a water-soluble ethylenically polymerized polymer characterized by a molecular weight of at least 2,000,000 and having a plurality of substituents along its polymer chain selected from the group consisting of alkali metal and ammonium carboxylates and sulfonates.

6. A method as in claim 5 wherein the cationic reagent used in conditioning the mixed sludge is a water-soluble cationic organic polymer.

References Cited

UNITED STATES PATENTS 3,259,570 7/1966 Priesing et al. _____ 210—10 X
3,300,407 1/1967 Priesing et al. _____ 210—10 X

OTHER REFERENCES

Keefer, C. E.: Sewage-Treatment Works, first edition, 1940, McGraw-Hill, New York, pp. 439–447, 452 and 453.

MICHAEL E. ROGERS, *Primary Examiner.*